United States Patent [19]

Lii

[11] Patent Number: 4,840,351
[45] Date of Patent: Jun. 20, 1989

[54] FAUCET STRUCTURE

[76] Inventor: Jong T. Lii, No. 2, Alley 203, Lane 51, Yung Ta Road, Yung Kang Hsiang, Tainan Hsien, Taiwan

[21] Appl. No.: 182,523
[22] Filed: Apr. 18, 1988
[51] Int. Cl.$^4$ .............................................. F16K 31/44
[52] U.S. Cl. ...................................... 251/230; 251/339
[58] Field of Search ............................... 251/339, 230; 137/624.11

[56] References Cited

U.S. PATENT DOCUMENTS 4,262,879 4/1981 Gonner ................................ 251/230
4,732,192 3/1988 Shen ................................. 251/339 X Primary Examiner—Alan Cohan
Attorney, Agent, or Firm—Morton J. Rosenberg

[57] ABSTRACT

A faucet structure having a hollow housing, a cap threaded with the housing, a valve body encompassed by the housing, and a stem threadedly securing within the valve body. A tubular element integrally and horizontally formed on the upper lateral surface of the housing to receive a water pipe. A steel ball to control the water flow rate is encased in an enlarged bore of the housing with a pad disposed beneath the steel ball to provide a sealing effect. A plurality of vertical strips are formed in the interior of the housing below the enlarged bore, and a threaded hole is laterally disposed through the housing on a pair of the strips which are oriented opposite to each other. A screw is encompassed by each threaded hole and has a tongue horizontally formed on a distal end of the screw to protrude from the surface of the strip and be received by a mortise provided on the valve body. A retaining ring and C-ring are provided on the exterior of the stem to cooperatively define the range that the valve body is threadedly slidable on the stem by turning an irregularly-formed end mounted on the bottom end of the stem.

2 Claims, 6 Drawing Sheets

FAUCET STRUCTURE

BACKGROUND OF THE INVENTION

The present invention relates to a faucet structure, and more particularly relates to an upward urging type faucet in which the volume of the water discharged from the faucet is controlled by rotation and reciprocation of a stem element.

Various types of water faucet assemblies have been developed in many parts of the world, but not without their drawbacks. The configurations of faucets always employ handles operated by turning or reciprocation to control the volume of the water. However, the handles became covered with bubbles or dirt after use so as to need regular cleaning, and the place close to the faucets get wet while the handle are being washed.

The present invention has arisen from work in seeking to obviate and/or mitigate the above-mentioned drawback.

SUMMARY OF THE INVENTION

A primary objective of the present invention is to provide a faucet structure in which the volume of the water discharged from the faucet is controlled by rotation and reciprocation of a stem element.

Another objective of the present invention is to provide a faucet structure which is operated without the employment of a handle mounted on and above the faucet.

Still another objective of the present invention is to provide a faucet structure in which it is convenient to turn on and turn off the faucet from the bottom of the faucet, so that no water is wasted when the user intermittently uses the water.

Another objective of the present invention is to provide a faucet structure which has performance chracteristics superior to any heretofore available.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
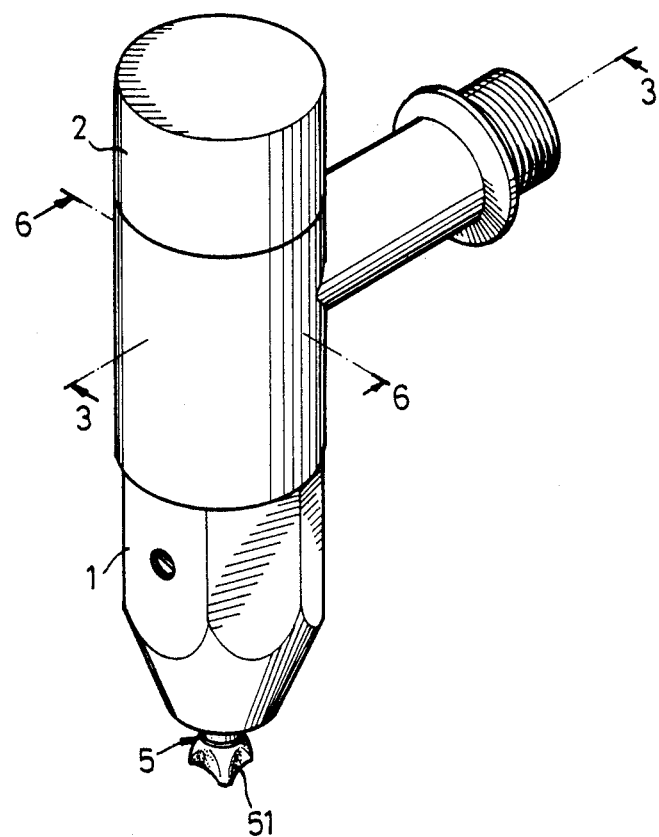
FIG. 1 is a perspective view of a faucet structure in accordance with the present invention.

With reference to the drawings and particularly to FIG. 1 thereof, it can be seen that a faucet structure in accordance with the present invention comprises a hollow housing 1, a cap 2 threadedly provided on the housing 1, and a stem 5 encompassed by the housing 1 with an irregularly-formed end 51 protruding from the bottom end of the housing 1.

Figure 2:
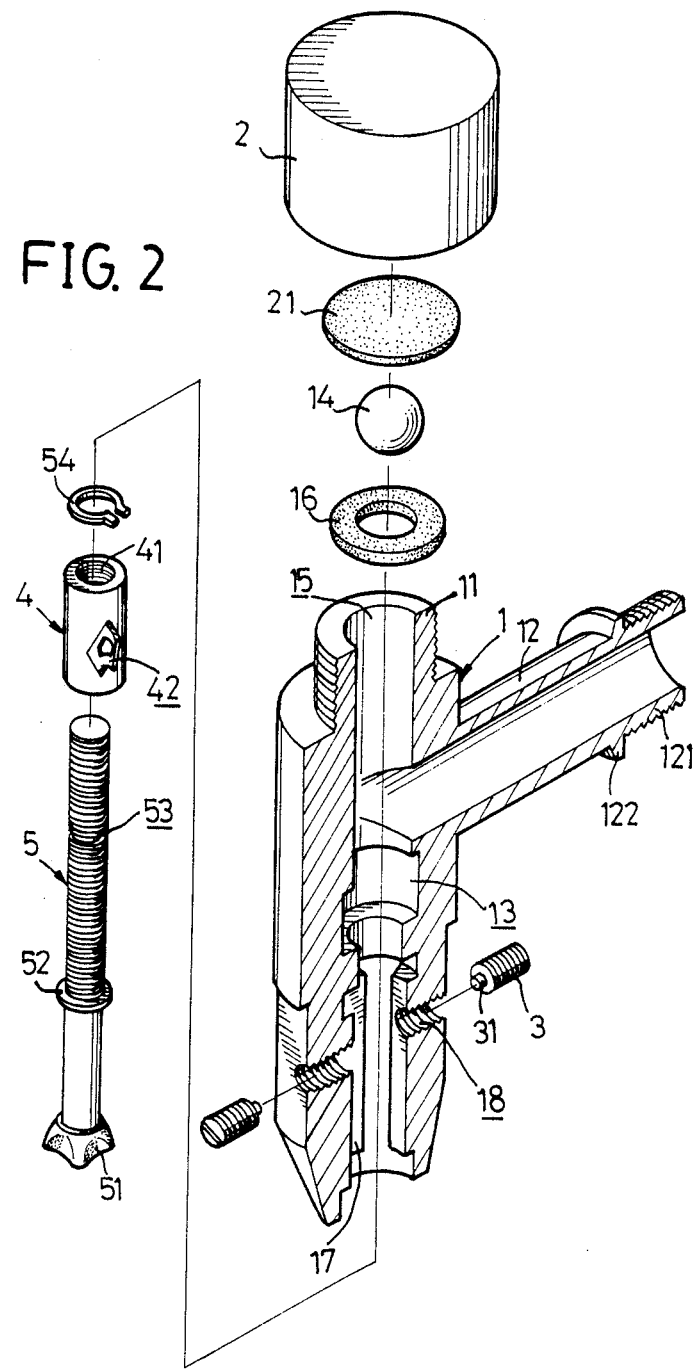
FIG. 2 is an exploded partly-cutaway view of the faucet structure of FIG. 1.
Figure 3:
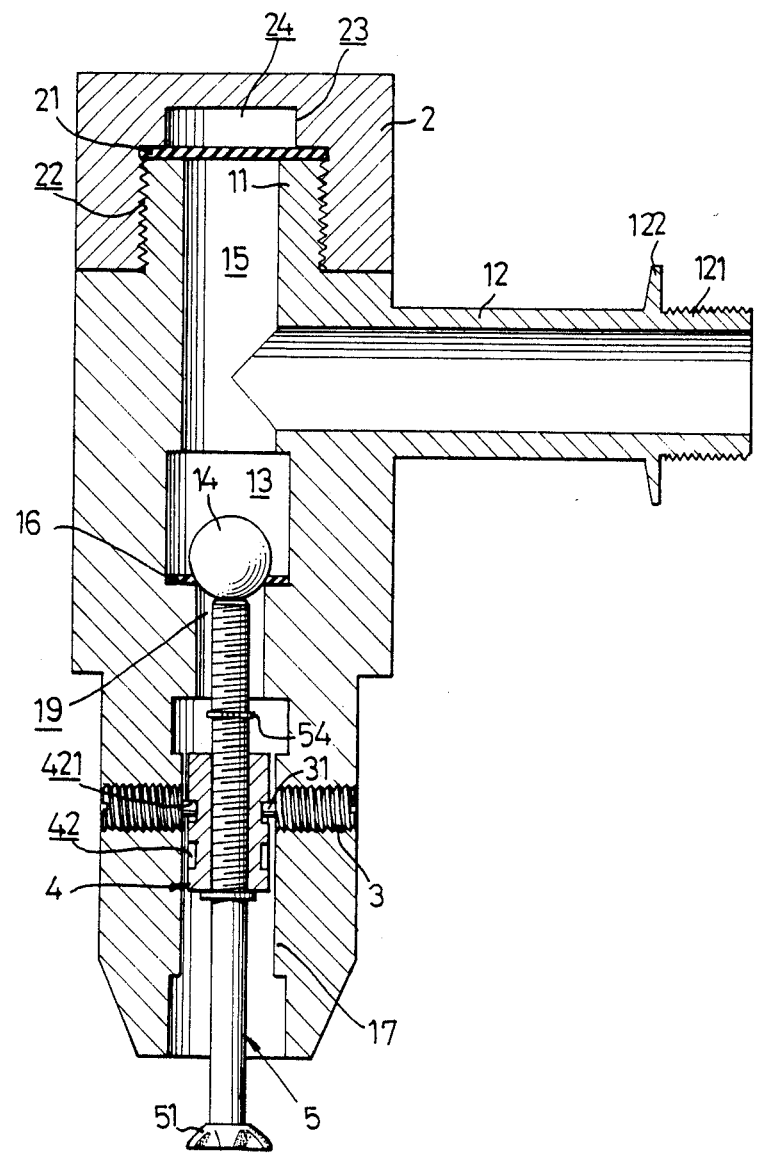
FIG. 3 is a cross-sectional view, taken along line 3—3 of FIG. 1, illustrating that a discharging passage is shut by a steel ball.

The housing 1, as shown in FIGS. 2 and 3, has a protruding end 11 on the top portion thereof for threadedly receiving the cap 2, with a circular gasket 21 disposed therebetween. The cap 2 has two bores with different dimensions, wherein the larger outer bore 22 is fomred to receive the protruding end 11, and the smaller inner bore 23 is isolated from the outer bore 22 by the circular gasket 21 so as to form a chamber 24. The object of the air-filling chamber 24 is reduce the rate of increase of the water pressure while the water enters the housing 1. A tubular means 12 is integrally and horizontally formed on the upper lateral surface of the housing 1, and the exterior terminal of the tubular means 12 is threaded 121 to receive a water pipe (not shown) with a retarding ring 122 against the water pipe.

The bore 13 of the housing 1, which is positioned below and adjacent to the junction of the housing 1 and the tubular means 12, is enlarged so as to permit a rotation and/or movement of a steel ball 14 therein. The steel ball 14 is encased in the housing 1 via the upper bore 15 of the housing 1 for controlling the water flow rate, since the diameter of the bore 15 is larger than the diameter of the steel ball 14; moveover, an annular pad 16 is disposed on the lower edge in the bore 13 to prevent damage to the steel ball 14 and to provide a perfect sealing effect beneath the steel ball 14.

A plurality of strips 17 are vertically and integrally formed in the lower interior of the housing 1 below the enlarged bore 13; furthermore, a threaded hole 18 is laterally formed through the housing 1 on a pair of the strips 17 wherein the two strips 17 are oriented opposite to each other. A securing screw 3 encompassed by each threaded hole 18 has a tongue 31 horizontally formed on a distal end thereof to protrude from the surface of the strip 17.

A valve body 4 has a threaded hole 41 axially extending therethrough, and two mortises 42 which are respectively disposed on opposite exterior thereof for receiving the tongues 31 on the screws 3. The shape of the mortise 42 will be fully detailed hereafter by disclosing the function due to the shape thereof. A stem 5 with a threaded upper portion is received by the valve body 4. A retaining ring 52 is disposed below the threaded portion on the exterior of the stem 5, and an annular groove 53 is formed above the retaining ring 52 to receive a C-ring 54 after the stem 5 is threadedly engaged with the valve body 4. It should be noted that the retaining ring 52 and the C-ring 54 cooperate to define the range that the valve body 4 is threadedly sllidable on the stem 5 by turning the end 51.

Figure 4:
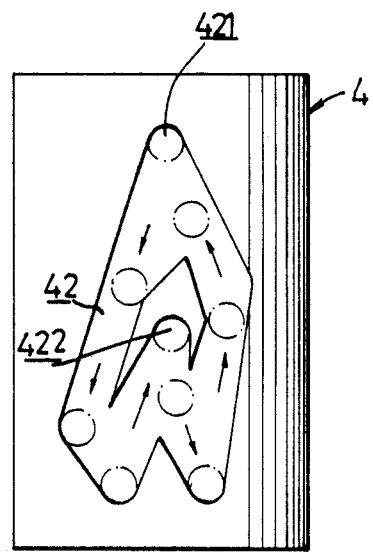
FIG. 4 is an enlarged view of the valve body of FIG. 2, illustrating the configuration of a mortise on the valve body.

As mentioned above, the mortise 42 has a looped structure, as shown in FIG. 4, with a curved path allowing for the movement of the valve body 4 to be actuated by the stem 5 while the tongues 31 fixed on the housing 1 are respectively lodged in the mortises 42. The relative movement of the valve body 4 with respect to the tongue 31 which is schematically shown in dotted circles along the mortise 42 is indicated by the arrows. It will be appreciated that the valve body 4 rotates when the stem 5 is reciprocated so that each time the stem is pushed up, the valve body 4 comes to rest either with an upper position 421 against the tongue 31 or a lower position 422 against the tongue 31. The tongue 31 is tightly pressed against the valve body 4 at the upper securing position 421 due to the pressure of the steel ball 14 when the valve body 4 is downwardly adjusted relative to the tongue 31 by pushing up the stem 5. Thereby, a discharge passage 19 is shut since the steel ball 14 acts as a block in the discharging passage 19.

As indicated by the arrows shown in FIG. 4, the tongue 31 is tightly against the valve body 4 at the lower securing position 422 due to the pressure of the steel ball 14 when the valve body 4 is upwardly adjusted relative to the tongue 31 by pushing up the stem 5. Thus, the discharging passage 19 permits water to flow therethrough while the steel ball 14 is out of its blocking position by the raised stem 5. Moreover, upon each reciprocation of the stem 5, the valve body 4 is either opened or closed.

Figure 5:
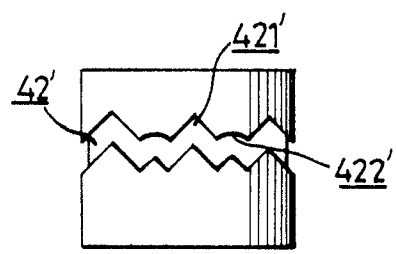
FIG. 5 is a view of a valve body of another embodiment in accordance with the present invention.

Another configuration of a valve body 4' is available in another embodiment according to this application, which is illustrated in FIG. 5. The valve body 4' is movable in a manner that the tongue 31 fixed in the housing 1 is lodged within a jagged mortise 42' and is retained either in the upper position 421' or in the lower position 422'.

As shown in the drawings, one pair of strips 17 laterally provided with a threaded hole 18 are shown, although it is apparent that more than one pair can be arranged. The same applies to the mortises 42 on the valve body 4, whereby more screws 3 can be engaged with the mortises 42 by the tongues 31 thereof.

Figure 6:
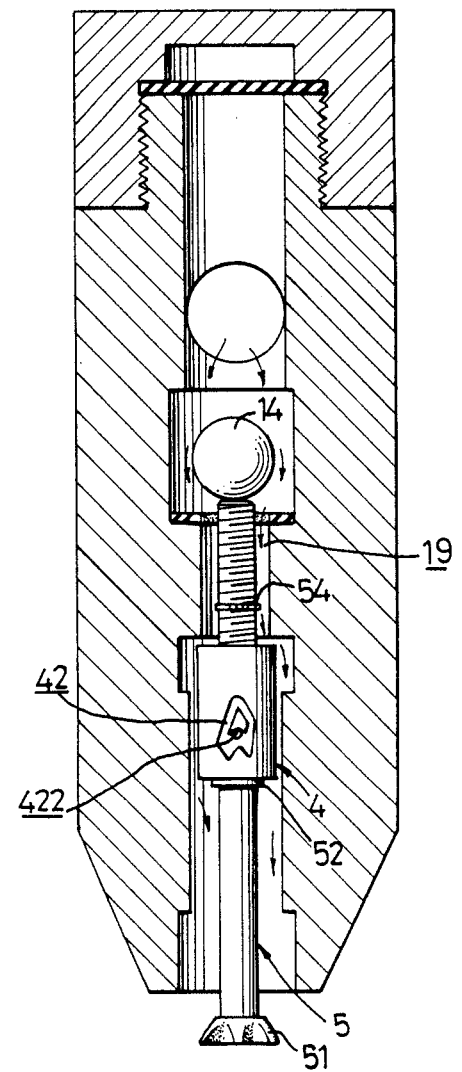
FIG. 6 is a cross-sectional view, taken along line 6—6 of FIG. 1, illustrating that the discharging passage is in its fully open position.

Referring to FIG. 3, it can be seen that the discharge passage 19 is blocked by the steel ball 14 with the top end of the stem 5 slightly touching the steel ball 14 when the stem 5 is spiralled up until the retaining ring 52 abuts on the bottom end of the valve body 4, and the tongue 31 is retained in the upper position 421 of the mortise 42. Furthermore, when the tongue 31 is in the lower position 422 by pushing up the stem 5 without rotating the stem 5, the discharge passage 19 is at its fully open position, as shown in FIG. 6. Moreover, the extent of the deflection of the steel ball 14 does not affect the flow of the water since the water-flow is constant.

Figure 7:
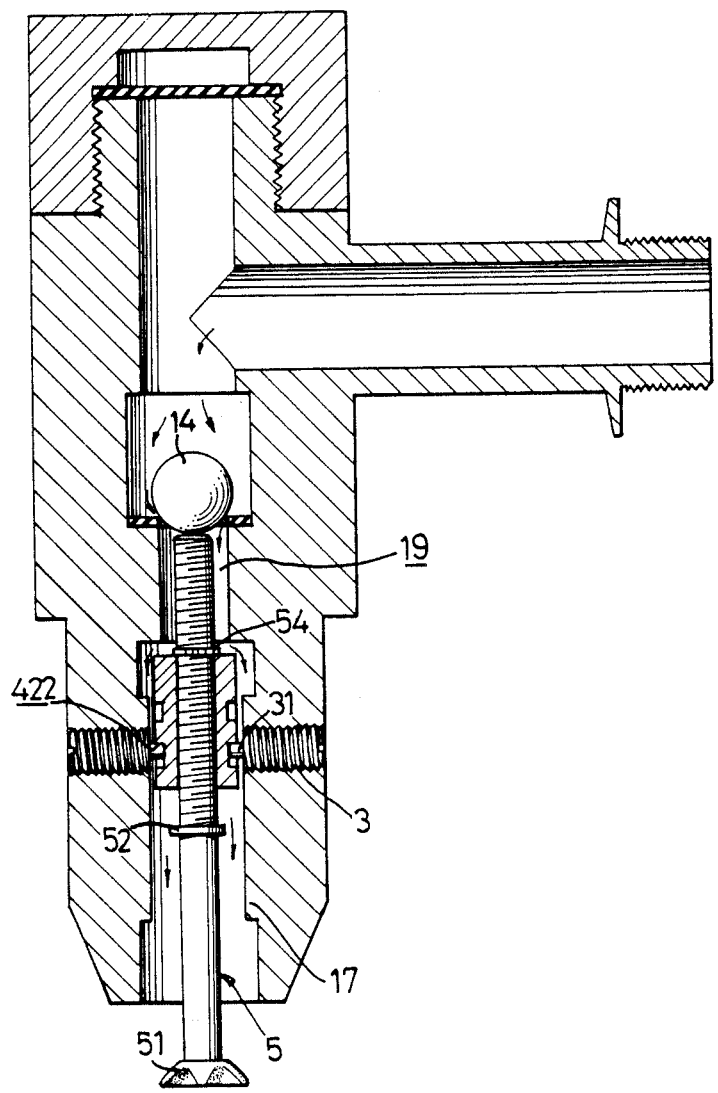
FIG. 7 is a view similar to FIG. 3, but illustrating the discharging passage in a slightly open position.

Further referring to FIG. 7, it can be seen that the discharge passage 19 is slightly open by the stem 5, raising the steel ball 14 a short distance when the stem 5 is spiralled down until the C-ring 54 abuts on the top end of the valve body 4, and the tongue 31 is retained in the lower position 422 of the mortise 42.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

I claim:

1. A faucet structure comprising:
   (a) a hollow housing (1) having a protruding end (11) on a top portion thereof, a tubular means (12) integrally and horizontally formed on an upper lateral surface thereof to threadedly engage with a water pipe, a steel ball (14) to control a volume of water being encased in an enlarged bore (13) of said housing (1), a pad (16) disposed beneath said steel ball (14) to prevent damage to said steel ball (14) and provide a sealing effect therebetween, a plurality of strips (17) formed in an interior of said housing (1) below said enlarged bore (13), and a threaded hole (18) laterally formed through said housing (1) on a pair of said strips (17) wherein said two strips (17) are oriented opposite to each other;
   (b) a cap (2) threadedly provided on said housing (1) with a circular gasket (21) disposed therebetween;
   (c) a plurality of plugs (3) which are threadedly received in respective threaded holes (18), said plugs (30) each having a tongue (31) horizontally formed on a distal end thereof to protrude from a surface of said strip (17);
   (d) a valve body (4) having a threaded hole (41) axially extending through a central part thereof, and two mortises (42) which are respectively disposed on opposite exterior sides thereof for receiving said tongues (31); and,
   (e) a stem (5) with a threaded surface on an upper part thereof being threaded through said valve body (4), a retaining ring (52) and C-ring (54) being provided on an exterior of said stem (5) to cooperatively define a range that said valve body (4) is threadedly urgeable on said stem (5) by turning an irregularly-formed end (51) which is mounted on a bottom end of said stem (5).

2. A faucet structure as set forth in claim 1, wherein said cap (2) has two bores with different dimensions; an outer bore (22) being formed to receive said protruding end (11), and an inner bore (23) being isolated from said outer bore (22) by said circular gasket (21) so as to form a chamber (24) for increasing the stability of said steel ball (5).

* * * * *